United States Patent [19]

Vidilles

[11] 4,008,831
[45] Feb. 22, 1977

[54] SAFETY RESERVOIR FOR HYDROCARBONS AND DANGEROUS LIQUIDS

[76] Inventor: Jacques Vidilles, 24, Boulevard Maillot, 92 Neuilly, France

[22] Filed: Aug. 6, 1975

[21] Appl. No.: 602,424

Related U.S. Application Data

[63] Continuation of Ser. No. 415,616, Nov. 14, 1973, abandoned.

[30] Foreign Application Priority Data

Nov. 20, 1972 France .............................. 72.41182

[52] U.S. Cl. .................................. 222/95; 222/105; 222/107; 220/85 B
[51] Int. Cl.² .................. B65D 35/28; B65D 35/56
[58] Field of Search ............ 220/85 B, 89 A; 22/95, 22/105, 107

[56] References Cited

UNITED STATES PATENTS

| | | | |
|---|---|---|---|
| 3,026,005 | 3/1962 | Cook | 222/105 |
| 3,055,553 | 9/1962 | Mapes et al. | 222/95 |
| 3,112,047 | 11/1963 | Weinrich et al. | 222/105 |
| 3,204,825 | 9/1965 | Underwood | 222/105 |
| 3,507,417 | 4/1970 | McCarthy et al. | 220/89 A |
| 3,734,149 | 5/1973 | Hansel | 141/350 |
| 3,747,800 | 7/1973 | Viland | 222/95 |

*Primary Examiner*—Stanley H. Tollberg
*Assistant Examiner*—Hadd S. Lane
*Attorney, Agent, or Firm*—Stevens, Davis, Miller & Mosher

[57] ABSTRACT

A safety reservoir is disclosed which is particularly suitable for use as a fuel tank in land, air or marine vehicles and which comprises a flexible inner reservoir of elastomeric sheet material contained within a rigid chamber formed of at least two part-shells joined together by means capable of releasing the shell parts under the effect of a predetermined impact or force. Self closing valve means of deformable elastomeric material are provided at inlet and outlet orifices to the flexible inner reservoir for sealing the reservoir upon removal of filling or emptying tubes or nozzles therefrom. Also disclosed is the use of a liquid impervious film of low tensile strength within the inner reservoir.

16 Claims, 11 Drawing Figures

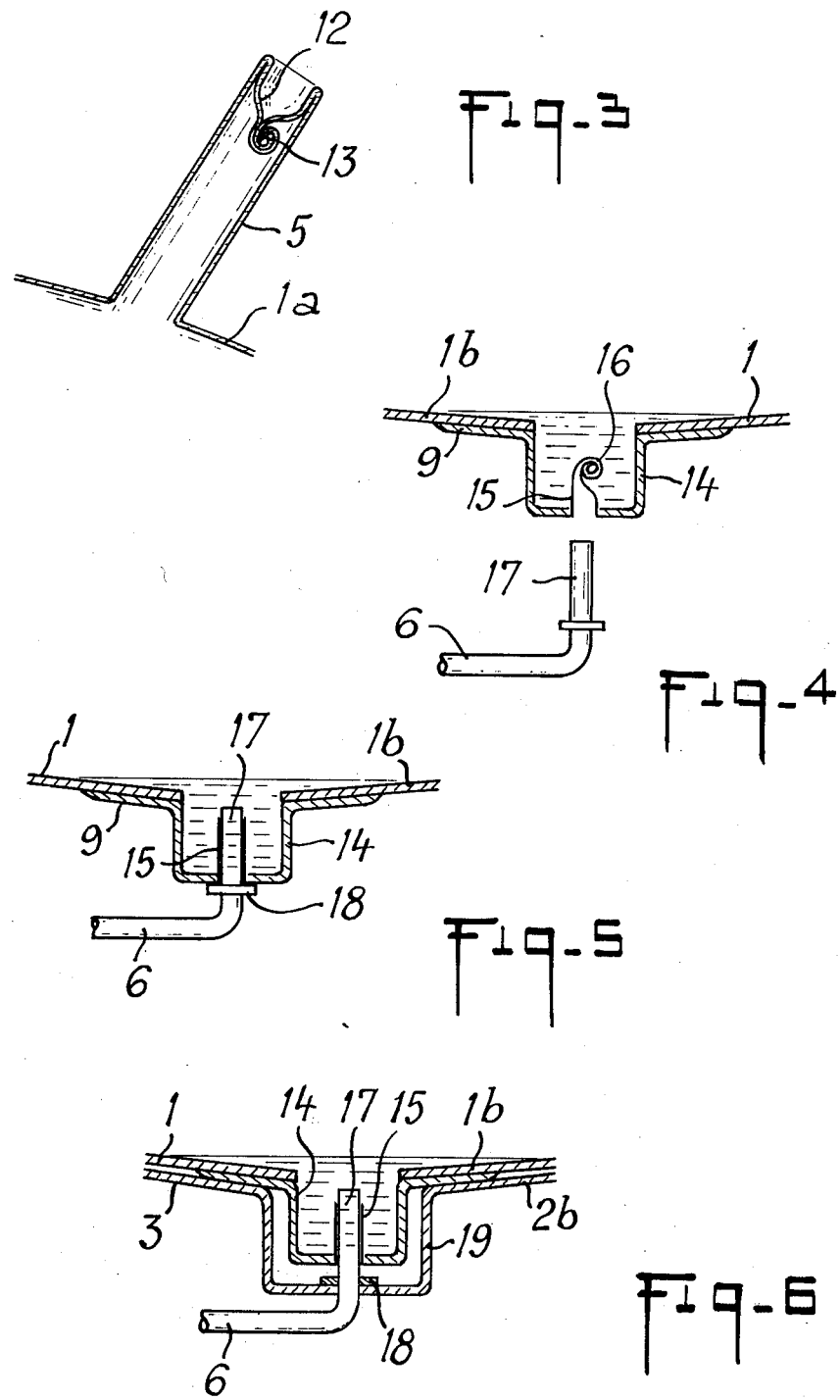

SAFETY RESERVOIR FOR HYDROCARBONS AND DANGEROUS LIQUIDS

This is a continuation of application Ser. No. 415,616, filed Nov. 14, 1973, now abandoned.

This invention relates to a safety reservoir and in its preferred form to a safety reservoir suitable for receiving hydrocarbons and dangerous liquids intended either for the fuel supply of engines of land, air or sea vehicles, or to be stored or transported.

There have been recent attempts to standardise on the use of flexible reservoirs, like those which have been used in aeronautics. In aeronautics, flexible reservoirs with high impact strenghs have been developed, the corresponding specifications laying down especially a free fall test which the reservoir must withstand when it is filled with liquid.

Likewise, for automobile competitions, the International Sporting Commission has laid down specifications one of which prescribes a free fall test for a fuel reservoir.

All these prior attempts to make a damage resistant reservoir have made use of the general technology of synthetic fabrics coated with elastomers which are resistant to hydrocarbons.

Generally in order to increase the strenght of such reservoirs there has been a tendency to increase the tensile strength characteristic of the textile, as well as its resistance to perforation.

As a result of this, curiously, the flexible reservoirs thus described tend to become rigid, and this leads to the main property of elastomers, namely their eleasticity 13 which is, after all, inherent 13 no longer being utilized.

Against this, the present invention provides for profitable use of the considerable advantages which can result directly from the elasticity characteristic of elastomers. In fact, those skilled in the art are in a position to produce flexible reservoirs which are based on elastomers and are completely free from textile supports as well as from any rigid component. Such reservoirs can be produced very easily from two calendered sheets of elastomers, placed face to face and joined around their periphery by vulcanisation.

At rest, these reservoirs possess zero capacity, but by providing a single orifice therein, it is possible to introduce into them a volume of liquid. The reservoir thus produced can contain, because of its deformation but with practically no stretching, a quantity of liquid which is conventiently called the nominal volume of the reservoir.

This nominal volume is obviously the greater, the greater is the surface area of one or other of the calendered sheets when flat within the peripheral extent defined by the join between the sheets.

Now, due to the fact that, for this manufacturing process, an elastomer-based mixture is chosen which posesses good resistance to hydrocarbons and which has adequate stretching capability, it becomes possible to introduce into the reservoir a volume of liquid which is incomparably greater than the nominal volume, remembering that the augmentation in the volume increases as the cube of the linear stretching.

In practice, such a reservoir manufactured from mixtures having an elongation at break of the order of 700% after vulcanisation and a nominal capacity of 20 litres, can contain more than 800 liters before effective rupture of the material of the reservoir takes place.

In experiments, the result of this is that such a reservoir filled beforehand to its nominal volume can be dropped in free fall from any height without bursting of the reservoir. This demosnstrates, if there is any need to do so, the enormous impact strenght of such a reservoir which, of course, is equally successful at resisting the crushing caused, for example, by an automobile wheel passing over its surface.

Now, furthermore, it is found that such a design is admirably suitable for mass production. In fact, the two identical faces which have to be joined around their periphery in order to produce the reservoir can be obtained simply be stamping them out of a previously calendered sheet of suitable thickness. The actual joining and the vulcanisation of the two sheets can also be carried out in accordance with several convenient processes, such as, for example, vulcanisation in an oven, in an autoclave or in a moulding, vulcanising or injecting press.

As a result of this, the only substantial investment in equipment required is practically limited to a high output cutting tool and, as accessories, to that tool or those tools which will be used for moulding or adding orifices, the other equipment necessary for the manufacturing process being, most of the time, part of the traditional equipment of rubber manufacturers.

Now, the same does not apply when the more traditional flexible reservoirs comprising a textile support are considered, since the textile support requires specialised equipment which creates great difficulty in respect of mass production. Thus when making the prior safety reservoirs a mould core is required which must have a certain rigidity being made, for example, of metal, wood, cardboard, expanded materials or foams and which must necessarily be either dismantled or partially or completely destroyed during the operation of release of the reservoir from the mould after manufacture.

The requirement for such a mould core specific for each shape of reservoir to be produced constitutes a serious obstacle to mass production of such prior reservoirs.

On the other hand, the flexible reservoir without any reinforcement, used with the present invention, frees the manufacturer from this constraint.

Now, although it is obvious that the flexible reservoir in itself possesses the concept of design which can solve the problems relating to mass production and to the safety of the user, the objection could however be raised that it would be difficult to use it as such for holding, for example, the fuel necessary for a land, sea or air self-propelling vehicle, due to its weakness in resisting perforation.

The present invention overcomes this drawback by providing about the flexible reservoir a rigid container which itself consists of two substantially indentical faces joined edge to edge. The role of the rigid container is to prevent the flexible reservoir from being perforated whilst the latter, due to its very design and due to its deformability, provides the necessary impact strength, and this can be observed by the behaviour of the whole when dropped from a very high altitude.

Moreover, a further purpose of the container is to limit the useful volume of fuel to a suitable value by limiting the stretching of the flexible reservoir.

According to the present invention there is provided a safety reservoir comprising a flexible inner reservoir made exclusively from easily stretchable elastomer sheet which is leakproof with respect to the external atmosphere when containing liquid and which inner reservoir is adapted to have a zero volume when empty, and a chamber formed by at least two part-shells made of a rigid material joined around their periphery by a means capable of giving way under the effect of a predetermined impact or force, the flexible inner reservoir being received in this chamber.

Due to the fact that the inside of the flexible reservoir need not be connected to the atmosphere, no air or any gas whatsoever need be introduced into the reservoir, even during the filling process, which can be carried out in a leakproof manner, this advantage being considerable because of the dangers which filling operations present.

Since the permeability to hydrocarbons of a reservoir made of elastomer is, at a constant temperature, inversely proportional to the thickness of the wall, the flexible reservoir according to the invention possesses a very low permeability from this point of view, taking into account the relatively great thickness of its wall; however, it is possible to make the operational permeability of this reservoir practically zero by providing, preferably on the internal surface thereof, a film possessing complete or practically complete leakproofness and consisting of a barrier material.

Such films are at present effective provided that they are not subjected to too great a tensile force.

In practice, rupture of these films corresponds to a stretching greater than 30%. Now, it is important to note that in normal operation, the reservoir which is the subject of the present invention is never used beyond its nominal capacity and thus in practice does not undergo any appreciable stretching.

On the other hand, in the case of serious impact requiring the properties of great elasticity of the flexible inner reservoir to be used, the film will be able to rupture. This will not in any way lead to the rupture of the main constituent of the wall, namely the sheet of elastomer, and the liquid contained in the reservoir will thus not be able to run out freely. When the vehicle involved in the accident is to be used again, it will be sufficient to replace all or part of the safety reservoir according to the invention.

Air or a gas under pressure, and especially exhaust gases from a vehicle engine, may be introduced between the flexible reservoir and the rigid chamber, the action of such compressed air or gas having the effect of supying the engine with fuel under pressure.

The filling and emptying orifices of the reservoir can be equipped with means of automatic sealing, which can be made in various ways and especially as will be described below.

Taking account of the complete absence of a connection between the vehicle and the filling orifice, of the possibility of the emptying tube being separated from the flexible reservoir under a definite force, and of the absence of a point of attachment with the rigid container, this results in the fact that, in case of impact, the reservoir is not subjected to any localised stress.

These means of automatic sealing are intended to close the emptying pipeline or pipelines, when the flexible or rigid tubing intended to supply the engine or engines is accidentally torn off, and permanently to seal the filling orifice except when liquid is supplied through a nozzle inserted thereinto.

In the construction of the flexible reservoirs which are known at the present time, the precaution is generally taken of introducing open cell foams into the reservoir in order to produce an anti-detonating action with respect to the fuel mixtures and an anti-ballast action which tends to oppose the movement of the centre of gravity of the combination and thus of the vehicle.

The use of such foams is not necessary with the reservoir of the invention due to the fact that, by its very design, it contains practically no gas phase and that, in addition, it has a marked tendency to oppose the movement of the liquid no matter what the volume of liquid effectively contained in the chamber may be.

It should be noted that the later described safety reservoir is much more suitable than the traditional reservoirs for being integrated into the vehicle or into its structure and that its positioning can consequently be investigated with a great deal of flexibility from the start of designing the vehicle.

In particular, it is perfectly possible to use components which already exist in the design of the vehicle in order advantageously to replace either one or both of the two half-shells.

It will be seen, however, that the later described exemplary embodiments make it possible to produce reservoirs which may readily be integrated into the structure of a vehicle intended for transporting dangerous liquids.

Since the safety reservoir comprises at least two part-shells, its manufacturing cost will be reduced relative to the present methods of construction using reinforced plastics, because the separate shell parts can themselves be readily and cheaply moulded.

Another example of use of a storge safety reservoir embodying the invention is as a fuel container for supplying a heating system. It will be noted that, in such an application, the reservoir comprises its own holding tank and that it is easy to introduce into the storage location, without necessitating construction in situ, and that there is little risk of the fuel containing condensed water.

The invention will be further understood from the following description given by way of example with reference to the accompanying drawings, in which:

FIG. 3 is a cross-sectional view of an embodiment of an inlet for the reservoir;

FIG. 4 is a cross-sectional view of an exemplary outlet tube from the reservoir before a discharge pipeline is fitted thereto;

FIG. 5 is a cross-sectional view similar to FIG. 4 but showing the outlet tube with the discharge pipeline fitted thereto;

FIG. 6 is a cross-sectional view similar to FIG. 5 but showing the mounting of the discharge pipeline in a rigid outer container;

Figure 1:
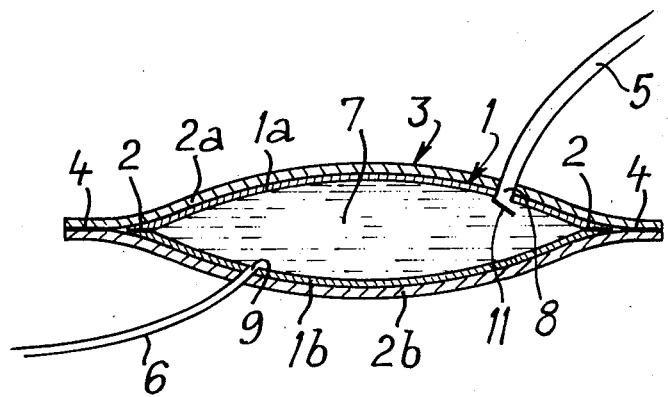
FIG. 1 is a cross-sectional view of a safety reservoir embodying the invention filled with liquid.
Figure 2:
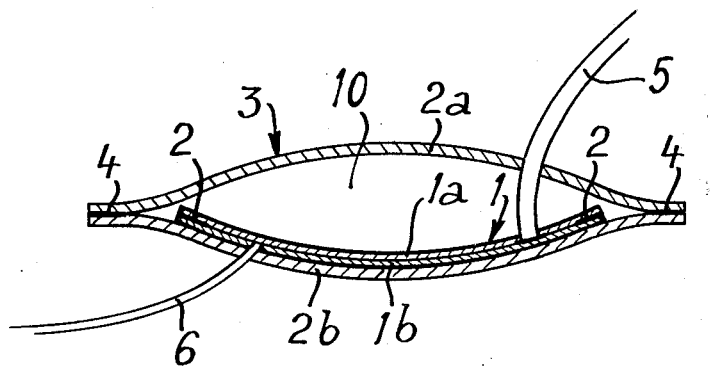
FIG. 2 is the same cross-sectional view of the reservoir of FIG. 1 when empty.

In FIGS. 1 and 2, a safety reservoir has been represented which comprises a flexible reservoir 1 consisting of two sheets 1a and 1b of elastic material, superposed and joined, by vulcanisation, in a zone 2 bounding their periphery. The said flexible reservoir 1, which is shown in FIG. 1 as containing a liquid 7, is placed in a chamber 3 consisting of at least two part or half-shells 2a and 2b made of a rigid or semi-rigid material, for example pressed steel or of a composite material, joined at their periphery at 4 by a means which can give way under the effect of a predetermined impact or force.

Figures 1A, 10:
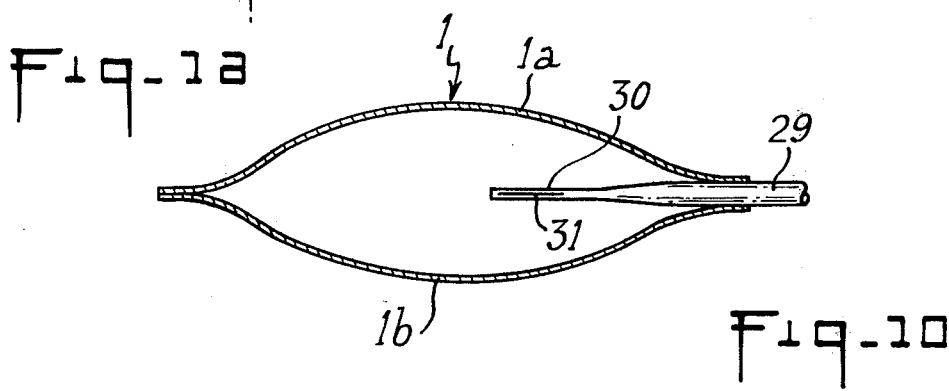
FIG. 1a is a cross-sectional view of a detail of a modified safety reservoir construction.
FIG. 10 is a cross-sectional view of a flexible reservoir possessing a valve made of elastomer moulded at the level of the joining plane of two sheets forming the reservoir.

The means of joining the half-shells 2a and 2b can comprise a fusible material as shown in FIG. 1 or a series of clips 20 as shown in FIG. 1a which press on the external faces of the lips of the half-shells, a gasket which may or may not be embedded in one or both half-shells optionally being placed between the latter. Instead of the clips a continous clamping profile may be provided about the peripheries of the shell parts.

It is to be noted that the method used to join the half-shells will be chosen as a function of the desired application, especially in the case where at least one of the half-shells consists of a part of a structure which has some addition functions, for example as part of a vehicle structure.

In particular, this join between the half-shells may or may not be leakproof. Thus it may be desired to use leakage through the join to provide a communication between the exterior of the rigid chamber formed by the half-shells and atmosphere.

The flexible reservoir 1 carries, on the surface of its internal face, a film of a leakproof barrier material.

A filling pipeline 5, and an emptying pipeline 6 leading to the engine of the vehicle in which the reservoir is mounted, are connected to the flexible reservoir 1.

The pipeline 5 is attached to the upper sheet 1a by means of a valve 11 provided at an orifice 8 at the end of the pipeline, whilst the pipeline 6 is connected to the lower sheet 1b.

The filling tube 5 is free from any other point of attachment, including attachment to the half-shell 2a in which a suitable aperture is provided.

Likewise, the discharge pipeline 6 is sufficiently strong so that, in case of impact under crash conditions, it will tend not to break but to separate completely from the flexible reservoir.

The reservoir can be firmly fixed to the structure of the vehicle by means of the half-shell 2b, it being possible to achieve this firm fixing especially at the level of the emptying orifice or orifices such as 9.

With a view to avoiding any localised stress at the level of the flexible reservoir, it will be advisable not to fix it firmly to either one of the half-shells, except by means of an automatic sealing device which is situated at the level of the emptying orifice and which can uncouple itself under a predetermined force.

In order to discharge the liquid 7, air or any gas can be introduced into the space 10 provided between the flexible reservoir 1 and the rigid chamber 2.

The means of measuring the volume of liquid in the reservoir are placed outside the flexible reservoir 1. In particular such means can be set to measure the distance between the upper face of the container and the upper face of the flexible reservoir.

In FIG. 3, a particular embodiment of the filling pipeline 5 has been represented which possesses, at its opening, an end 12 which is turned back towards the inside and is vulcanised to form a self-sealing spiral 13. In order to open the pipeline thus produced, it is necessary to introduce the fuel dispensing nozzle into the end 12, so that the spiral 13 unwinds and the gun is brought into communication with the inside of the pipeline. When the nozzle is withdrawn, the spiral 13 resumes its coiled shaped and seals the said pipeline.

It is also possible to use a filling or emptying pipeline possessing a non-return valve made of elastomer, for example of the "duck beak" type as used in underwater diving-suits.

In FIGS. 4, 5 and 6, a method of mounting the emptying pipeline 6 on the flexible reservoir is illustrated.

A moulded component 14 made of elastic material, forming a well, is attached by any known means to the sheet 1b, the said component comprising a self-sealing tube 15, the end of which is vulcanised and wound up, flat to form a spiral 16 which provides a seal when it is wound up as is represented in FIG. 4.

When the end 17 of the emptying pipeline 6 is introduced into the tube 15, the spiral 16 is caused to unwind and the said pipeline is brought into communication with the inside of the flexible reservoir 1. The end 17 of the pipeline 6 is equipped with a stop-ring 18 acting as an abutment to ensure correct insertion of the end 17 into the tube 15.

On the half-shell 2b, a seat 19, which is manufactured in the same process as the half-shell, is provided and the moulded component 14 is placed in this seat during the assembly of the combination.

Figures 7, 9:
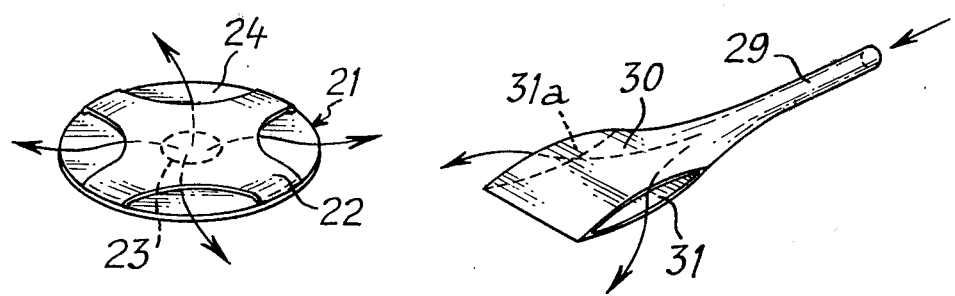
FIG. 7 is a view in perspective of a valve possessing deformable discs which may be used with the reservoir.
FIG. 9 is a view in perspective of a one-way fluid flow valve made of elastomer of the "duck beak" type.

In FIG. 7, a one way flow valve is illustrated which consists of two superposed discs 21 and 22 which are made of elastomer and are joined at their periphery, one of the discs 21 possessing a central orifice 23 and the other disc 22 possessing peripheral apertures 24. The disc 21 is vulcanised or glued onto the internal face of the flexible reservoir in such a way that the central orifice 23 coincides with a corresponding orifice formed in the wall of the flexible reservoir.

The liquid can enter the reservoir via the central orifice 23 and, due to deformation of the disc 22, it can escape through the peripheral orifices 24. On the other hand, since the liquid contained in the reservoir exerts a pressure on the disc 22, the latter normally seals the central orifice 23 and prevents the liquid contained in the reservoir from flowing out.

In order to discharge the liquid contained in the reservoir, it suffices to introduce a nozzle of suitable shape from the outside into the orifice 23 in order to move the discs 21 and 22 apart from one another and allow the liquid to pass through the peripheral apertures 24 and through the central orifice 23.

Figure 8:
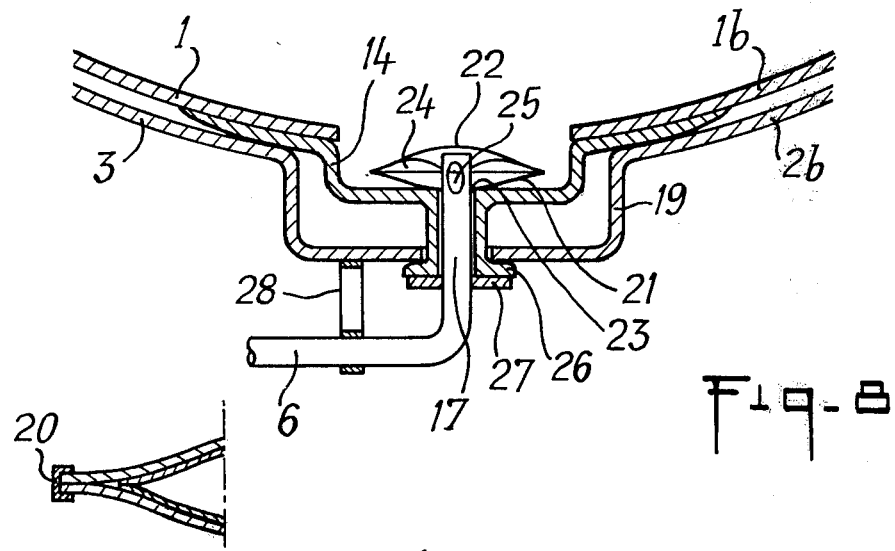
FIG. 8 is a cross-sectional view similar to FIG. 6 but showing a variant of the self-sealing discharge outlet.

In FIG. 8, a variant of the discharge device has been represented in which a valve of the type represented in FIG. 7 has been mounted in the well 14.

In this case, the nozzle 17 of the emptying tube 6 plays two roles:

firstly, it holds the valve 21, 22 open and makes it possible for the liquid to flow through orifices 25 which are provided on the nozzle 17; and secondly, the well 14 and the flexible reservoir 1 with which it is combined can eject the rigid components 17 and 19 only by forcing a deformable bead 26 of the well 14 made of elastomer through a narrower orifice provided in the seat 19. A ring 27, firmly fixed to the tube 17, makes it possible to limit the penetration of this tube to a suitable length to open the valve 21, 22.

A detachable collar 28 secured to the bottom of the seat 19 and engaging the tube 17 holds the tube 17 in place and prevents it from escaping from the bore of the well 14.

In FIG. 9, a tube 29 has been represented, one end 30 of which, of widened shape, is vulcanised flat and possesses two side slits 31 and 31a to form a "duck beak" one way flow valve system of a kind that is well known and used in independent diving-suits.

It is found that any fluid whatsoever can be introduced via the tube 29 and can escape thereafter via the side slits 31 and 31a which open under the pressure of the fluid. On the other hand, since these slits tend to close up in the absence of a stream of fluid in the direction defined above, no flow of fluid in the opposite direction is possible.

In FIG. 10, a flexible reservoir is shown comprising a filling tube 29 of the type represented in FIG. 9. This tube is moulded at the level of the joining plane of the upper and lower sheets of the flexible reservoir. The flexibility of the "duck beak" tube thus arranged naturally makes it possible for the reservoir to empty itself via an orifice which is not represented in the figure, the upper sheet 1a then taking up a position so that is lies flat on top of the lower sheet 1b without damage or difficulty.

I claim:

1. A vehicle fuel tank comprising
   an expandable flexible reservoir having two stretchable elastomeric walls which are impermeable to said fuel and are disposed in face to face contact when the reservoir is empty, said walls being bonded together in face to face contact around the peripheral edges thereof in a fluid impermeable seal,
   a rigid housing enclosing a chamber having a shape and dimensions corresponding substantially to the shape and dimensions of the said reservoir when expanded by fuel contained therein without stretching of the walls, said housing being divided into two parts having overlapping peripheral edges which are joined by a means which permits separation of the two parts in response to an impact blow on the housing,
   said reservoir being disposed completely in the chamber and substantially unattached to the housing.

2. The fuel tank of claim 1 wherein the said elastomeric walls are coated on their internal surfaces with a leakproof film which will rupture when the walls of the reservoir are stretched more than 30%.

3. A safety reservoir according to claim 1, including a leakproof film having a low tensile strength provided on the internal surface of the flexible reservoir.

4. A safety reservoir according to claim 1, having orifice means communicating with the interior of the flexible inner reservoir and connection means between the flexible inner reservoir and the rigid chamber located adjacent said orifice means, said connection means adjacent said orifice means comprising the only connection between the flexible inner reservoir and the rigid chamber and including a joint adapted to uncouple under a predetermined separtion force.

5. A safety reservoir according to claim 1, including at least one orifice leading to the interior of the flexible inner reservoir, said orifice being provided with an automatic sealing valve adapted to be actuated by the insertion of a liquid flow tube thereinto.

6. A reservoir according to claim 5, wherein the automatic sealing valve is made entirely of elastomer and functions solely by deformation thereof.

7. A safety reservoir according to claim 6, wherein said orifice is provided with a filling tube extending exteriorly of the safety reservoir for receiving a nozzle for the supply of liquid to the reservoir, the filling tube having a deformable component of elastomer adapted to provide a leakproof connection between the nozzle and the tube.

8. A safety reservoir according to claim 7, wherein the filling tube has one end remote from the flexible inner reservoir, said one end comprising a vulcanised spiral which is wound up flat and turned back toward the inside of the pipeline to form a leakproof and self-sealing valve.

9. A safety reservoir according to claim 1, including a filling tube moulded at the level of the joining plane of the upper and lower sheets of the flexible reservoir.

10. A safety reservoir according to claim 5, comprising a moulded component of elastomer in the form of a well attached to said flexible reservoir, said well being provided with a tube having an end internally of the reservoir in the form of a vulcanised spiral wound up flat for receipt of a pipeline from the exterior of the flexible reservoir.

11. A safety reservoir according to claim 10, wherein one part-shell contains a seat formed therein to receive said moulded component forming the well of the flexible reservoir.

12. A safety reservoir according to claim 1, including a measuring device located within the chamber exteriorly of the flexible reservoir for measuring the volume of liquid within the flexible reservoir.

13. A safety reservoir according to claim 1, including a plurality of clamping clips connecting peripheral portions of the part-shells together.

14. In a vehicle a safety reservoir according to claim 1, mounted with said rigid chamber secured to the structure of the vehicle.

15. A vehicle according to claim 14, wherein one of the rigid part-shells forms an integral part of the vehicle.

16. A vehicle according to claim 14, including means for introducing air or gas under pressure into the space between the flexible inner reservoir and the rigid chamber for causing liquid contained in the flexible reservoir to be expelled therefrom.

* * * * *